United States Patent
Garg et al.

(10) Patent No.: US 8,050,199 B2
(45) Date of Patent: Nov. 1, 2011

(54) ENDPOINT REGISTRATION WITH LOCAL BACK-OFF IN A CALL PROCESSING SYSTEM

(75) Inventors: Sachin Garg, Green Brook, NJ (US); Chandra M. R. Kintala, Warren, NJ (US); Edward Vincent Naybor, Fairfax, VA (US); David Thomas Stott, Basking Ridge, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1338 days.

(21) Appl. No.: 10/940,464

(22) Filed: Sep. 14, 2004

(65) Prior Publication Data

US 2005/0068907 A1    Mar. 31, 2005

Related U.S. Application Data

(60) Provisional application No. 60/507,179, filed on Sep. 30, 2003.

(51) Int. Cl.
 *H04L 12/16* (2006.01)
(52) U.S. Cl. ........ 370/270; 370/352; 370/448; 709/233; 705/51
(58) Field of Classification Search ........... 370/259–271
 See application file for complete search history.

(56) References Cited

U.S. PATENT DOCUMENTS

| | | | |
|---|---|---|---|
| 5,206,903 A | 4/1993 | Kohler et al. | |
| 5,226,077 A | 7/1993 | Lynn et al. | |
| 5,754,639 A | 5/1998 | Flockhart et al. | |
| 5,905,793 A | 5/1999 | Flockhart et al. | |
| 5,960,001 A * | 9/1999 | Shaffer et al. | 370/448 |
| 6,192,122 B1 | 2/2001 | Flockhart et al. | |
| 6,563,920 B1 | 5/2003 | Flockhart et al. | |
| 6,633,640 B1 | 10/2003 | Cohen et al. | |
| 6,697,858 B1 | 2/2004 | Ezerzer et al. | |
| 6,728,236 B2 | 4/2004 | Potter et al. | |

(Continued)

FOREIGN PATENT DOCUMENTS

EP    1047241 A2    10/2000

(Continued)

OTHER PUBLICATIONS

Zhao et al., U.S. Appl. No. 60/423,371, filed Nov. 4, 2002.*

(Continued)

*Primary Examiner* — Fan Tsang
*Assistant Examiner* — Ibraham Sharifzada

(57) ABSTRACT

A call processing system, which may include multiple distributed call center sites, utilizes a local back-off approach to endpoint registration. The call processing system comprises a plurality of endpoints and at least a first server, wherein the endpoints register with the first server in order to send and receive calls in the call processing system. Responsive to an end-to-end connectivity failure or other designated event, a registration process is initiated in the call processing system for a given one of the endpoints. The issuance of at least one message of the sequence for the given endpoint is controlled so as to provide a local random back-off or other local back-off of the controlled message at that endpoint. For example, a second server implemented as an aggregation server may be operative to control the issuance of messages by the endpoints so as to provide a local random back-off for each of the plurality of endpoints by staggering the delivery of failure notifications to the endpoints.

19 Claims, 9 Drawing Sheets

U.S. PATENT DOCUMENTS

| | | | |
|---|---|---|---|
| 6,785,223 B1* | 8/2004 | Korpi et al. | 370/218 |
| 2002/0067822 A1 | 6/2002 | Cohen et al. | |
| 2002/0101860 A1* | 8/2002 | Thornton et al. | 370/352 |
| 2003/0026241 A1* | 2/2003 | Ono et al. | 370/349 |
| 2003/0053480 A1* | 3/2003 | Jang et al. | 370/445 |
| 2003/0123619 A1 | 7/2003 | McKinnon et al. | |
| 2003/0167343 A1* | 9/2003 | Furuno | 709/244 |
| 2004/0078338 A1* | 4/2004 | Ohta et al. | 705/51 |
| 2004/0260831 A1* | 12/2004 | Dyck et al. | 709/233 |
| 2004/0261101 A1* | 12/2004 | Iwamura | 725/32 |
| 2006/0221925 A1* | 10/2006 | Beathard | 370/342 |
| 2008/0056226 A1* | 3/2008 | Zhao et al. | 370/342 |

FOREIGN PATENT DOCUMENTS

| | | |
|---|---|---|
| WO | 0169862 A2 | 9/2001 |

OTHER PUBLICATIONS

PCT/US04/32496, Jun. 20, 2006, PCT International Search Report.

Plarre, "DE Application No. 11 2004 001819.6-56 Office Action Jul. 9, 2009", , DPMA, Published in: DE.

Courtenay, Dr. Andrew, "GB Application No. GB0603998.6 Examination Report Dec. 7, 2006", , Publisher: UK IPO, Published in: GB.

* cited by examiner

- ✴ FAILURE DETECTED
- △ GRQ SENT
- ▼ GRQ RECEIVED
- ♪ RIP SENT
- ◉ RCF SENT

- ✴ FAILURE
- △ GRQ SENT
- ▼ GRQ
- ♪ RIP SENT
- ◉ RCF SENT
- ▭ RANDOM BACKOFF

→ FAILURE NOTIFICATION BY AS
△ GRQ SENT
▼ GRQ RECEIVED
♪ RIP SENT
● RCF SENT

ENDPOINT REGISTRATION WITH LOCAL BACK-OFF IN A CALL PROCESSING SYSTEM

PRIORITY CLAIM

The present application claims the priority of U.S. Provisional Patent Application Ser. No. 60/507,179, filed Sep. 30, 2003 and entitled "Method and Apparatus for Dependability Enhancement in a Distributed Multi-Site Call Center," the disclosure of which is incorporated by reference herein.

FIELD OF THE INVENTION

The invention relates generally to call centers or other call processing systems in which voice calls, e-mails, faxes, voice messages, text messages, Internet service requests or other types of communications are distributed among a number of service agents for handling, and more particularly to call centers which include multiple geographically-distributed work sites.

BACKGROUND OF THE INVENTION

Call centers distribute calls and other types of communications or work items to available service agents in accordance with various predetermined criteria. A given call center may be implemented in a geographically distributed manner, e.g., as a combination of multiple distributed call center sites at different locations. Such an arrangement is commonly referred to as a multi-site call center or more generally a multi-site call processing system. In multi-site systems of this type, a centralized load balancing process is typically utilized in order to distribute communications among the various sites for processing.

An exemplary multi-site call processing system is described in U.S. Pat. No. 6,633,640, issued Oct. 14, 2003 in the name of inventors R. A. Cohen et al. and entitled "Methods and Apparatus for Analysis of Load-Balanced Multi-Site Call Processing Systems," which is commonly assigned herewith and incorporated by reference herein.

Despite the numerous advantages provided by the techniques described in the above-cited reference, a need remains for further improvements, particularly in terms of enhancing the dependability of multi-site call processing systems. For example, an important cause of instability in a given multi-site call processing system relates to an overload situation as endpoints attempt to register after a network failure, equipment shutdown or other similar condition. Techniques are needed which can provide improved performance in these and other situations.

SUMMARY OF THE INVENTION

The present invention provides dependability enhancement techniques suitable for implementation in a multi-site call processing system or other type of call processing system.

In accordance with one aspect of the invention, a call processing system, which may include multiple distributed call center sites, utilizes a local back-off approach to endpoint registration. The call processing system comprises a plurality of endpoints and at least a first server, wherein the endpoints register with the first server in order to send and receive calls in the call processing system. Responsive to an end-to-end connectivity failure or other designated event, a registration process is initiated in the call processing system for a given one of the endpoints. The issuance of at least one message of the sequence for the given endpoint is controlled so as to provide a local random back-off or other local back-off of the controlled message at that endpoint.

In an illustrative embodiment, a second server implemented as an aggregation server is configured to control the issuance of messages by the endpoints, so as to provide a local random back-off for each of the plurality of endpoints, by staggering the delivery of failure notifications to the endpoints.

Advantageously, the invention in the illustrative embodiment considerably alleviates the above-described overload situation that could otherwise result as endpoints attempt to register after a network failure, equipment shutdown or other similar condition.

DETAILED DESCRIPTION

Although the invention will be illustrated below in conjunction with the processing of calls in an exemplary system which includes multiple distributed call center sites, it is not limited to use with any particular type of system configuration or communication processing application. For example, the invention may be used in single-site call processing systems. Also, the invention is applicable to the processing of incoming communications, outgoing communications or both. The disclosed techniques can be used with automatic call distribution (ACD) systems, telemarketing systems, private-branch exchange (PBX) systems, computer-telephony integration (CTI)-based systems, as well as in combinations of these and other types of call centers. A call center in accordance with the invention may be configured using any type of network infrastructure, such as, e.g., asynchronous transfer mode (ATM), local area networks, wide area networks, Internet Protocol (IP) networks, etc.

The term "call center" as used herein is thus intended to include any type of ACD system, telemarketing system or other communication system which processes calls or other service requests, including voice calls, video calls, multimedia calls, e-mail, faxes, text chat or voice messages as well as various portions or combinations of these and other types of communications. The term "call" as used herein is intended to include any of the above-noted types of communications as well as portions or combinations of these and other communications.

Figure 1:
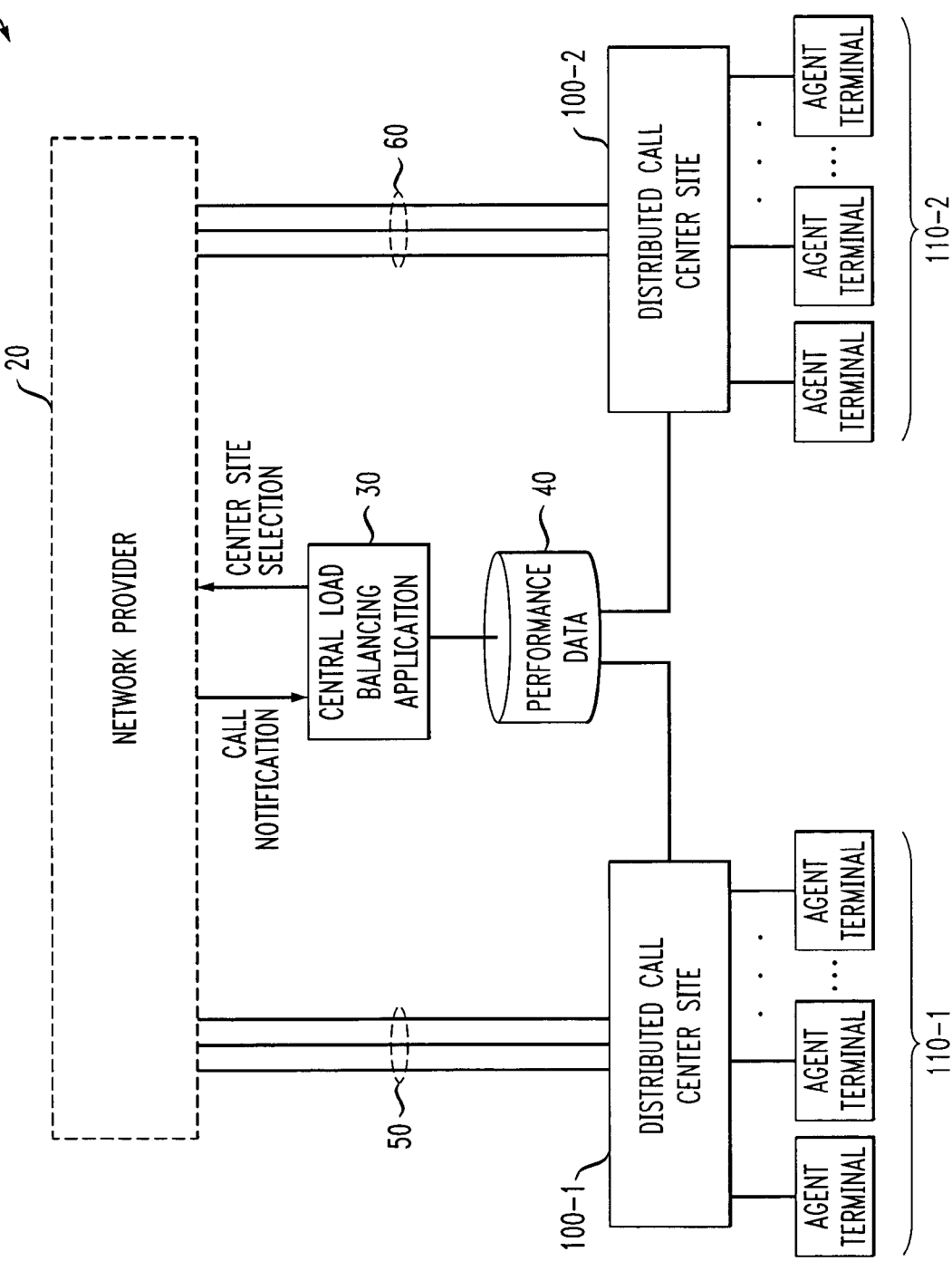
FIG. 1 is a block diagram of an exemplary multi-site call processing system in which the invention may be implemented.

FIG. 1 shows an illustrative call processing system 10 including multiple distributed call center sites. The system 10 includes a network provider 20, a central load balancing application 30, and a set of performance data 40. The network provider 20 is coupled via sets of trunks 50 and 60 to distributed call center sites 100-1 and 100-2, respectively. Associated with each of the distributed call center sites 100-$i$, $i=1$, 2, ..., is a corresponding set of agent terminals 110-$i$. It will be appreciated that although only two sites are shown in FIG. 1, the invention can be implemented in a system having any desired number of sites. Also, as indicated previously, the invention can be implemented in a single-site call processing system.

In one possible configuration instance, at least a subset of the agent terminals 110 may be separated from the call center sites 100 via one or more service provider networks (not shown). Such a configuration is desirable in applications in which the agent terminals need to be geographically distributed, but the call center sites or one or more associated servers need to be located at a single location for the sake of maintainability, security or privacy. Numerous other configurations are possible, as will be appreciated by those skilled in the art.

The agent terminals 110 may be viewed as examples of what are more generally referred to herein as endpoints. Such endpoints may include, by way of example, IP telephones or other types of telephones, computer terminals, workstations, etc.

Each of the call center sites 100-1 and 100-2 may include, in addition to other elements, one or more servers, as will be described in greater detail below.

Endpoints typically register with a corresponding server of the call center site, as is well known.

In operation, central load balancing application 30 receives notification of an incoming call from the network provider 20. The central load balancing application 30 then accesses the performance data 40 in order to determine where to route the call, i.e., which of the distributed call center sites 100-$i$ should receive the call. The central load balancing application 30 notifies the network provider 20 of its call center site selection, and the network provider 20 accordingly routes the incoming call to the selected one of the distributed call center sites 100-$i$ over the appropriate trunk. Within the selected site, conventional agent selection and call selection techniques may be used to direct the incoming call to a particular agent terminal in the corresponding set of agent terminals 10-$i$. This process is repeated for all incoming calls directed to the multi-site call processing system 10. Performance data is collected from the distributed call center sites 100-$i$ and stored in the set of performance data 40 for use by the load balancing application 30 in making future call routing decisions.

Figure 2:
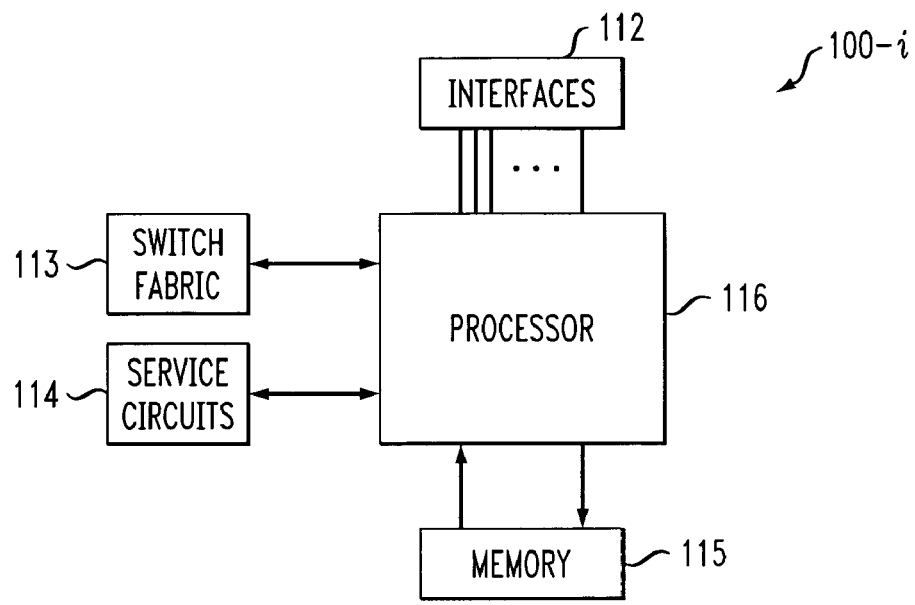
FIG. 2 is a block diagram of one possible implementation of a distributed call center in the multi-site call processing system of FIG. 1.

FIG. 2 shows a simplified block diagram of one possible implementation of a given one of the distributed call center sites 100-$i$ in the system 10 of FIG. 1. The distributed call center site 100-$i$ comprises interfaces 112 to external communication links, a communications switch fabric 113, and service circuits 114 which may be, e.g., tone generators, announcement circuits, etc. The distributed call center site 100-$i$ further includes a memory 115 and a processor 116. The memory 115 may be used for storing, e.g., control programs, data, etc., and may be an electronic memory, a disk-based memory or a combination of these and other memory elements. The processor 116 is configured to execute stored control programs to control the interfaces 112 and the switch fabric 113, to provide call distribution functionality, and to provide storage or processing of e-mails, faxes and other communications. The processor 116 may be, e.g., a microprocessor, a central processing unit (CPU), a computer, an application-specific integrated circuit (ASIC), or various portions or combinations of these and other processing elements.

The distributed call center site 100-$i$ of FIG. 1 may comprise a communication system switch, such as a DEFINITY® Enterprise Communication Service (ECS) communication system switch available from Avaya Inc. of Basking Ridge, N.J., USA.

Another example call processing switch suitable for use in conjunction with the present invention is the MultiVantage™ (MV) communication system switch, also available from Avaya Inc.

Such devices may be viewed as comprising examples of what are more generally referred to herein as servers.

One or more servers, or portions or combinations thereof, may be implemented, by way of example, utilizing the memory 115 and processor 116.

Generally, an example embodiment of a given call center site may include multiple servers, such as an MV server, a Dynamic Host Configuration Protocol (DHCP) server, and a Trivial File Transfer Protocol (TFTP) server. These and other server arrangements commonly utilized in call centers are well known to those skilled in the art. Such servers may be implemented within a system switch, or external to such a switch. Also, a given switch may be viewed as comprising one or more servers.

Additional details regarding call processing techniques that may be utilized in the distributed call center site 100-$i$ may be found in, e.g., U.S. Pat. No. 5,206,903 issued Apr. 27, 1993 in the name of inventors J. E. Kohler et al. and entitled "Automatic Call Distribution Based on Matching Required Skills with Agents Skills," U.S. Pat. No. 5,905,793 issued May 18, 1999 in the name of inventors A. D. Flockhart et al. and entitled "Waiting-Call Selection Based on Anticipated Wait Times," U.S. Pat. No. 6,192,122 issued Feb. 20, 2001 and entitled "Call Center Agent Selection that Optimizes Call Wait Times," U.S. patent application Ser. No. 09/219,995, filed Dec. 23, 1998 in the name of inventors R. A. Cohen and R. H. Foster and entitled "Call Selection Based on Continuum Skill Levels in a Call Center," and U.S. Pat. No. 6,563,920 issued May 13, 2003 in the name of inventors A. D. Flockhart et al. and entitled "Methods and Apparatus for Processing of Communications in a Call Center Based on Variable Rest Period Determinations," all of which are incorporated by reference herein.

It should be noted that the particular arrangement of system 10 and the elements thereof as shown in FIGS. 1 and 2 is by way of example only, and should not be construed as limiting the invention to any particular embodiment or group of embodiments. The invention can be implemented in many other types of multi-site processing system configurations, such as those described in U.S. Pat. No. 5,754,639 issued May 19, 1998 in the name of inventors A. D. Flockhart et al. and entitled "Method and Apparatus for Queuing a Call to the Best Split," which is incorporated by reference herein.

The exemplary system described in conjunction with FIGS. 1 and 2 may be programmed or otherwise configured in a straightforward manner to implement the dependability enhancement techniques of the present invention as described below.

As indicated previously, an important cause of instability in a system such as that described above relates to an overload situation as endpoints attempt to register after a network failure, equipment shutdown or other similar condition. The term "register" in this context is intended to include a process which enables IP endpoints or other endpoints to make themselves known to a server so that they can place and receive calls in the system. For example, in the case of IP endpoints, the registration process may involve the binding of IP addresses for the endpoints to particular system extensions.

The process of failure detection and registration in conventional systems is typically accomplished via message exchanges which are specified in the ITU-T recommendations, including ITU-T Recommendation H.323, "Packet based multimedia communication systems," 1998, and ITU-T Recommendation H.245, "Control protocol for multimedia communication," 1998, both of which are incorporated by reference herein. For example, when a Transmission Control Protocol (TCP) keep-alive timeout occurs at an IP endpoint, a connectivity failure may be assumed to have occurred. The exact determination of failure is usually not based on a single timeout, but a sequence of keep-alive timeouts.

Following failure detection, the recovery process starts, which may include the discovery of the server and/or an associated Avaya control local area network (CLAN) board or other device, followed by registration of the endpoint with that server. The discovery procedure involves GRQ/GCF messages, whereas the registration involves RRQ/RCF messages. GRQ and GCF denote Gateway Request and Gateway Confirm, respectively, and RRQ and RCF denote Registration Request and Registration Confirm, respectively. The GRQ/GCF and RRQ/RCF messages may be collectively viewed as one particular example of what is more generally referred to herein as a "registration sequence."

In an example distributed system implementation, a network outage at a given call center site may cause recovery initiation by as many as 1000 or more IP phones or other endpoints within a short duration. The flood of GRQ messages causes the associated server to be overloaded. The net result of overload is loss of GRQs, which leads to multiple registration retries by a large subset of the endpoints. Some may eventually go into a reboot mode. The overload occurs since the server is typically limited to processing only a certain number of simultaneous registration sequences, such as 10. As a more specific example, a typical IP endpoint exchanges a User Datagram Protocol (UDP) message sequence with the server in order to register itself. A successful registration procedure at the server may involve the following steps:

1. Receiving GRQ from the endpoint.
2. Sending GCF to the endpoint in reply.
3. Receiving RRQ from the endpoint.
4. Replying to the endpoint with RCF.

Figure 3:
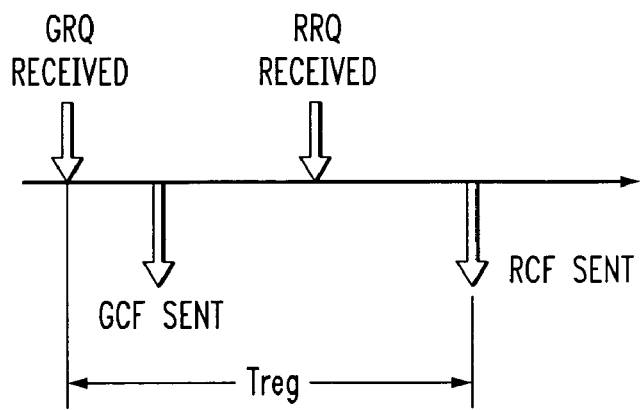
FIG. 3 is a timing diagram showing a successful registration sequence for an endpoint of the FIG. 1 system.

The total time taken for these steps is what we shall call the registration time Treg. The time and message exchange sequence is depicted in FIG. 3.

If an RRQ message is not received at the server within a specified time, e.g., within 15 seconds of it sending a GCF message to the endpoint, then the server releases the registration. It will be assumed that, due to limitations of its associated login manager elements, the server can only process 10 simultaneous registrations (although other embodiments may use login manager elements able to handle more or fewer simultaneous registrations). In other words, if at any time 10 registration procedures are underway, then no more GRQs can be processed at that time. If x GRQs arrive at the server within a registration time period, where x is greater than 10, then x-10 requests are dropped. This problem is further exacerbated under certain conditions, for example, if the server and IP endpoints are separated by an overseas wide area network (WAN) link with a significant mean one-way delay, e.g., a delay of approximately 150 milliseconds or more.

In a given system, two complementary solutions may be implemented to handle the registration overload problem. The first one is rate throttling of GRQs and the second one is the use of Registration-in-Progress (RIP) messages. Each is briefly described below.

1. Rate Throttling of GRQs. The notion is to throttle the flood of GRQs before they reach the server. One of the elements which allows throttling is a gateway router at the call center site. In a typical deployment, the router may be configured to rate limit the GRQ requests to a value at or below the rate the server can handle, which may be approximately 100 GRQs per second.

2. Use of RIP messages. Since the server in the present example can only process 10 simultaneous registration sequences, in the case of a GRQ flood, a substantial number of endpoints time out waiting for GCF and start to retry with GRQs, thereby worsening the flood. In this solution, the server sends out a RIP message to the endpoint before dropping the GRQ, requesting it to retry after a timeout interval specified in the RIP message. This timeout is normally larger than the local timeout at the endpoint, resulting in slowing down of GRQs arriving at the server.

For the remaining description, the use of rate throttling and RIP messaging shall be assumed in the description of the illustrative embodiment unless noted otherwise. Also, it will be assumed that the registering endpoints comprise IP endpoints, although the techniques are also applicable to a wide variety of other types of endpoints. It should be appreciated, however, that these and other assumptions referred to herein need not apply in alternative embodiments of the invention.

In accordance with one aspect of the invention, the above-described rate throttling and RIP messaging solutions are supplemented through the use of an approach referred to herein as local random back-off by endpoints.

We emphasize that the intent in the illustrative embodiment is not to replace, but to complement the rate throttling and RIP messaging mechanisms for handling the registration overload problem. However, a given embodiment of the invention could utilize only the local random back-off approach while eliminating one or both of the two other mechanisms.

The proposed local random back-off solution provides the following advantages:

1. Reduces the overall recovery time when an outage occurs. The use of RIP does reduce the mean recovery time compared to when no RIP messages are sent out. However, the use of local random back-off further reduces the recovery time.

2. Enhances the robustness of the recovery process.

In order to sketch the basic ideas behind the local random back-off approach in the illustrative embodiment, we first outline the recovery process as follows. For the sake of discussion, assume that a CLAN board was upgraded and was reset. This causes almost instantaneous failure detection at all endpoints as a TCP reset packet is sent for all open signaling channels on that CLAN. As soon as an endpoint detects the failure, it starts the recovery procedure by sending out a GRQ request.

Figure 4:
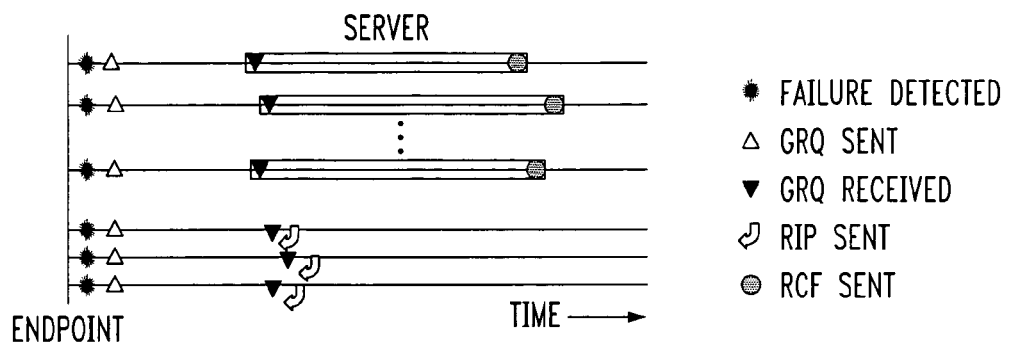
FIG. 4 is a timing diagram showing a bottleneck that may arise when a large number of endpoints make substantially simultaneous registration attempts in the FIG. 1 system.

FIG. 4 illustrates a situation in which multiple substantially simultaneous registration attempts are made in the FIG. 1 system. In this timing diagram and other timing diagrams herein, time is shown on the horizontal axis. Events from typical IP endpoints are depicted as symbols with legends. It should be noted that RRQ messages are not shown for clarity and simplicity of illustration.

The GRQs are generated at the endpoints and are received at the server within a short span. While the first 10 GRQs grab available login manager elements at the server and engage in the registration sequence, any subsequent arrivals receive a RIP message back. Note however, that the following conditions still hold true:

1. GRQs are queued at the server and are examined in a first-in first-out (FIFO) manner.

2. Sending a RIP message consumes server processor resources.

3. A RIP message back to the endpoint has the potential of being lost in transit.

In other words, the RIP messaging solution works on the principle of "tolerating" the GRQ flood once it starts to occur.

Figure 5:
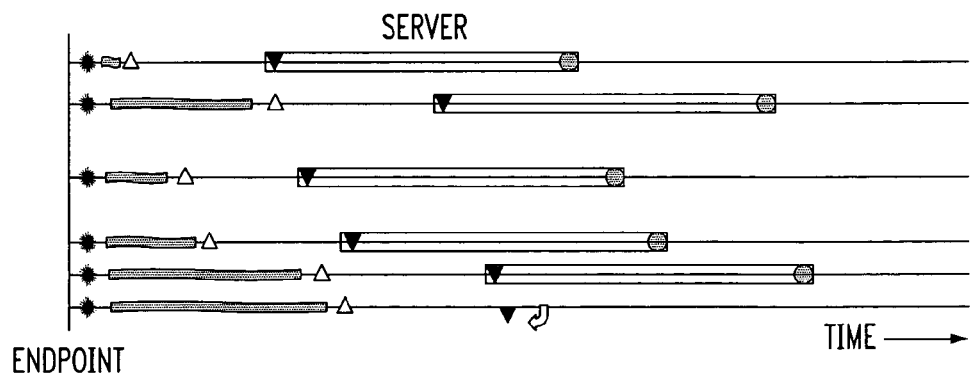
FIG. 5 is a timing diagram showing the use of local random back-off before registration initiation in accordance with an illustrative embodiment of the invention.

The local random back-off approach of the present invention is complementary to RIP as it aims to prevent the occurrence of the GRQ flood to begin with. The timing diagram of FIG. 5 illustrates one implementation of the random back-off approach.

The lack of arrival of TCP keep-alive messages from the CLAN to the IP endpoint (with timeouts and retries) is construed as a failure of end-to-end connectivity. Missing RAS keep-alive messages, where appropriate, may also be used to detect failures. Once an IP endpoint detects a failure, it starts the re-registration process by sending out a GRQ message to the CLAN in its list. In the random back-off approach of the illustrative embodiment, the IP endpoint performs a random back-off after failure detection and before the GRQ is sent. The range of the random numbers is determined by factors such as the total number of IP endpoints, the platform (e.g., Avaya DEFINITY® G3r, Avaya DEFINITY® S8700, etc.) and preferably should be preconfigured. In a scenario with 1000+ IP phones or other endpoints in a single call center site, when simultaneous recovery starts, the registration initiation gets staggered because of the back-off. There are several potential benefits of this, which are listed below.

1. Generating RIP messages consumes CPU resources at the server. The use of local back-offs reduces the contention for CPU resources at the MV server and more CPU resources are then available for registration processing and call processing since the need for generating RIP messages is reduced.

2. System/endpoint recovery is less susceptible to loss of RIP messages as there are fewer RIP messages to begin with. As indicated above, a RIP message from the server to the endpoint may be lost in network transit.

3. GRQ messages are queued at various processes/components before finally being processed by the server. These include the CLAN interface and associated higher protocol processes, other processes at the server, etc. It is possible in a sudden burst of GRQs for some queue to overflow, resulting in the loss of a GRQ before it is processed. The local back-off at the endpoint substantially reduces the probability of queue overflow by controlling the GRQ rate at the source, i.e., the endpoint.

4. In general, the recovery state machine is more robust as there is less probability of the endpoint exhausting its retries on an available CLAN and therefore trying another one on the list. In some cases without RIP messaging in place, it was noted that phones went into a reboot cycle.

The above benefits directly lead to a reduction in the average recovery time of an IP endpoint in a situation where a large number of IP endpoints lose connectivity and try to re-register. In other words, in a call center scenario, the total average time it takes for the endpoints to recover is lower in comparison to the case when no random back-off is used by the endpoints. This benefit is quantified and explained in detail below.

The IP endpoints in the illustrative embodiment preferably are provided with an indication of an optimal back-off duration $M_{opt}$. When the registration procedure is started, the endpoints may draw a random sample between 0 and $M_{opt}$ and wait for that many seconds before sending out GRQs. Given that $M_{opt}$ depends on the number of endpoints registered with the server and the CPU capacity of the server platform, one way to notify and/or configure the endpoints is via the server.

For instance, during an initial boot-up and/or registration procedure (where a default back-off of 0 seconds may be used), the MV server indicates the value of $M_{opt}$ to the endpoint. This value may be statically configured in the MV server by an administrator, or otherwise provided to the server.

It is also possible for the endpoints to obtain the value of $M_{opt}$ from a DHCP server in one of the optional parameters. The DHCP server, in turn, could be administered manually or otherwise with the value.

In accordance with another aspect of the invention, an additional architectural element is introduced, which we refer to as the aggregation server (AS). The purpose of this additional element is not only to help resolve the registration overload issues, but also provide other benefits which will be discussed below.

Figure 6:
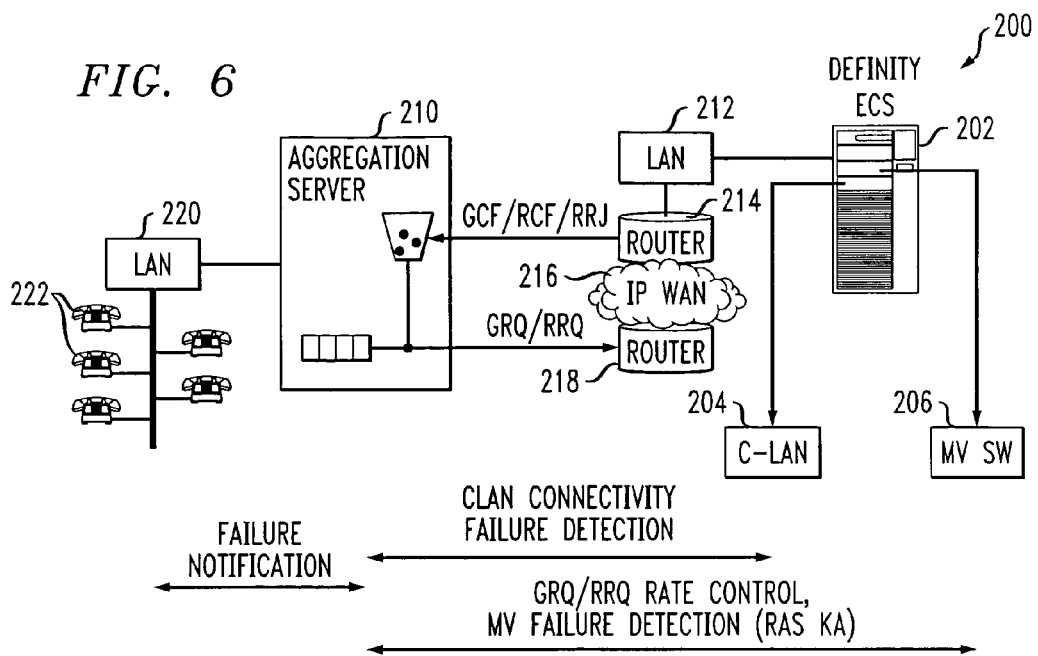
FIG. 6 is a block diagram of one possible implementation of at least a portion of the FIG. 1 system, comprising an aggregation server (AS) in accordance with an illustrative embodiment of the invention.

FIG. 6 illustrates an example of the placement of an AS in an example call center site, as well as its functionality. Although the AS in the figure is shown as a separate network element, this is not necessarily the case. For instance, some of the capabilities of the AS could be co-located with another system server, such as an MV server or a TFTP server. The set of system elements shown in FIG. 6 may be viewed as representing one possible implementation of at least a portion of the FIG. 1 multi-site call processing system, or of a single-site call processing system.

The acronym RRJ in the figure denotes Registration Reject, the acronym RAS denotes Registration Admissions Signaling, and the acronym KA denotes keep-alive.

As shown in the figure, a call processing system 200 comprises an Avaya DEFINITY® ECS switch 202 which in this embodiment includes as elements thereof an Avaya CLAN 204 and a software-based MV server 206. The switch 202 is coupled via LAN 212, router 214, WAN 216 and router 218 to AS 210. The AS 210 is coupled via LAN 220 to endpoints 222. Thus, the AS 210 is coupled between the switch 202 and the endpoints 222 in this embodiment.

The CLAN 204 in this embodiment serves as an IP interface to the MV server 206. For example, the CLAN receives GRQ messages and passes them to the MV server.

In an example deployment of this type, the IP endpoints 222 typically connect to the MV server 206 over a WAN link. Functions such as failure detection, registration, call signaling and call data all traverse the WAN link with separate end-to-end connections between each endpoint and the server. For instance, each endpoint has its own TCP connection with the CLAN 204 over which TCP keep-alives are exchanged. Since the WAN link has a limited capacity which is shared for call signaling, call data and management traffic, any aggregation of traffic should free up the link for more calls.

Therefore, the AS 210 in this embodiment is placed at the call center site to serve as an aggregation point for many functions which are performed by the IP endpoints on an individual basis. Examples of these functions are listed below.

1. Aggregate TCP keep-alive heartbeat messages to/from the CLAN. For the same utilization of the WAN link, keep-alives can be sent/received at a much higher frequency. This would result in a substantial increase in the time to detect AS to CLAN connectivity failures. Since the AS is on the same LAN as the endpoints, first, failures are less likely to occur and second, redundancies could mask any failures which do occur.

2. Aggregate RAS keep-alive messages to/from the MV server. Similarly, aggregating RAS keep-alive messages to/from the MV server would enable higher frequency exchanges. More importantly, it enables reduction of the CPU load on the MV server. Without aggregation, for G3rs, this overload is substantial enough that the RAS timeout is of the order of minutes. Although, the CPU overhead of RAS keep-alives is less on the S8700 platform, the benefit of aggregation still applies.

Figure 7:
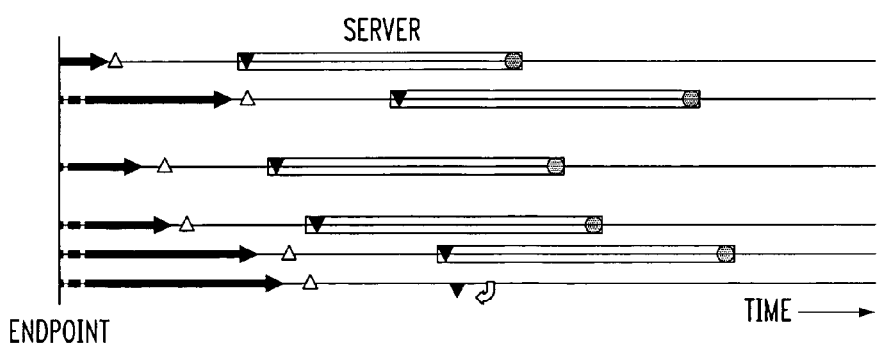
FIG. 7 is a timing diagram illustrating the operation of the AS of FIG. 6.

3. Staggering failure notifications to the endpoints. This function is to achieve the effect of local back-off at the endpoints. As shown in the timing diagram of FIG. 7, instead of the endpoints waiting voluntarily after the failure detection, the detection itself is staggered.

In other words, instead of failure detection happening at the endpoints, with TCP keep-alives aggregated, the detection will first happen at the AS. The endpoints then may not be notified immediately of the failure upon which they will each start the re-registration procedure. Rather, the AS can stagger the notifications in time to each endpoint such that a GRQ flood is avoided.

4. Registration rate control and aggregation. The AS can also serve as a registration proxy for all endpoints local to its site. This could be easily achieved, for example, by setting the IP address of the AS to the first address in a list of one or more server addresses that is sent to the endpoint or manually configured at the endpoint, or by use of DHCP. Such a feature may require the AS to have part of the H.323 stack. In the least, the NAT/PAT capability is needed if the AS were to serve as a pass-through proxy acting only at layer 3.

The following are examples of beneficial features which can be provided in the system if the AS were implemented to serve as a proxy.

1. Since the GRQs are now destined for the AS, a flood will only occur over the LAN to the AS. The AS can deploy rate control mechanisms to control the rate of GRQs passing through to the MV server. As shown in the diagram of FIG. 6, the rate control could be based on a token bucket scheme, in which the tokens are generated based the rate of RCF and GCG messages from the MV server to the endpoints.

2. The AS can combine multiple GRQs into a single packet that is sent to the MV server. Although this results in network resource savings, the protocol between the AS and the server becomes non-standard. An approach in which this GRQ aggregation occurs only when the failure is known to be a catastrophic failure might also be beneficial.

3. If the AS is seen as the server from the point of view of the IP endpoints, it is likely that the RTP streams will traverse AS as well. In a call center scenario, multiple such streams will pass through AS and into the remote MV server. From a bandwidth utilization standpoint, compressing and aggregating RTP packets into larger packets at the AS and then decompressing and de-packetizing at the server would be beneficial.

The complexity of a given target call processing system may make it difficult to understand its detailed behavior when a large number of endpoints register simultaneously. To better understand this behavior, we utilized an event-based simulator to perform a number of simulations as described below.

The simulation includes the endpoints, LANs, WAN, CLAN, MV server, DHCP server, and TFTP server. Each element has certain settable parameters (such as the amount of time needed to process each particular message type). Elements also maintain the state information needed to process protocols such as DHCP, TFTP, H323 RAS, etc.

The simulator was able to predict the behavior of a system with the proposed enhancements. For example, the local random back-off approach was added to the simulator without having to implement the feature in actual endpoints.

It should be noted that the presence of certain estimated parameters, such as message processing times, represent a limitation on the accuracy of the simulator.

One particular question we wanted to answer was how much the local random back-off technique improved the recovery time. To quantify this, the simulator varied the spacing between the time the endpoints started (referred to as the boot rate).

The sets of simulation trials that only varied the endpoint boot rate were grouped into runs. In each run, the endpoint boot rate was evaluated at rates of 5 ms, 10 ms, 20 ms, 40 ms, 75 ms, 100 ms, 150 ms, and 250 ms. Because one of the primary advantages of the back-off solution is that the MV process spends less time processing RIP messages, intuitively, the RIP message processing time should be a factor for the effectiveness of the strategy. The RIP message processing time was evaluated at 2.5 ms, 5 ms, and 15 ms.

Since the rate-limiting solution solved a similar problem, the runs were repeated with rate-limiting being simulated using example rates. Similarly, we expected the back-off to be more useful when there was high packet loss between the endpoints and the server since the RIP messages might be lost. To explore this hypothesis, the runs were repeated with a 5% packet loss probability.

Next, the data was then examined to compare the time to register all the endpoints against the time to register 90% and 95% of the endpoints to see if the final few registrations were significant. Then, the experiments were repeated with 2000 endpoints to see how the number of endpoints registering affects the registration time. Finally, the experiments were repeated such that the endpoints began to register at random (independently selected) times instead of fixed times (with constant spacing between them).

Figure 8:
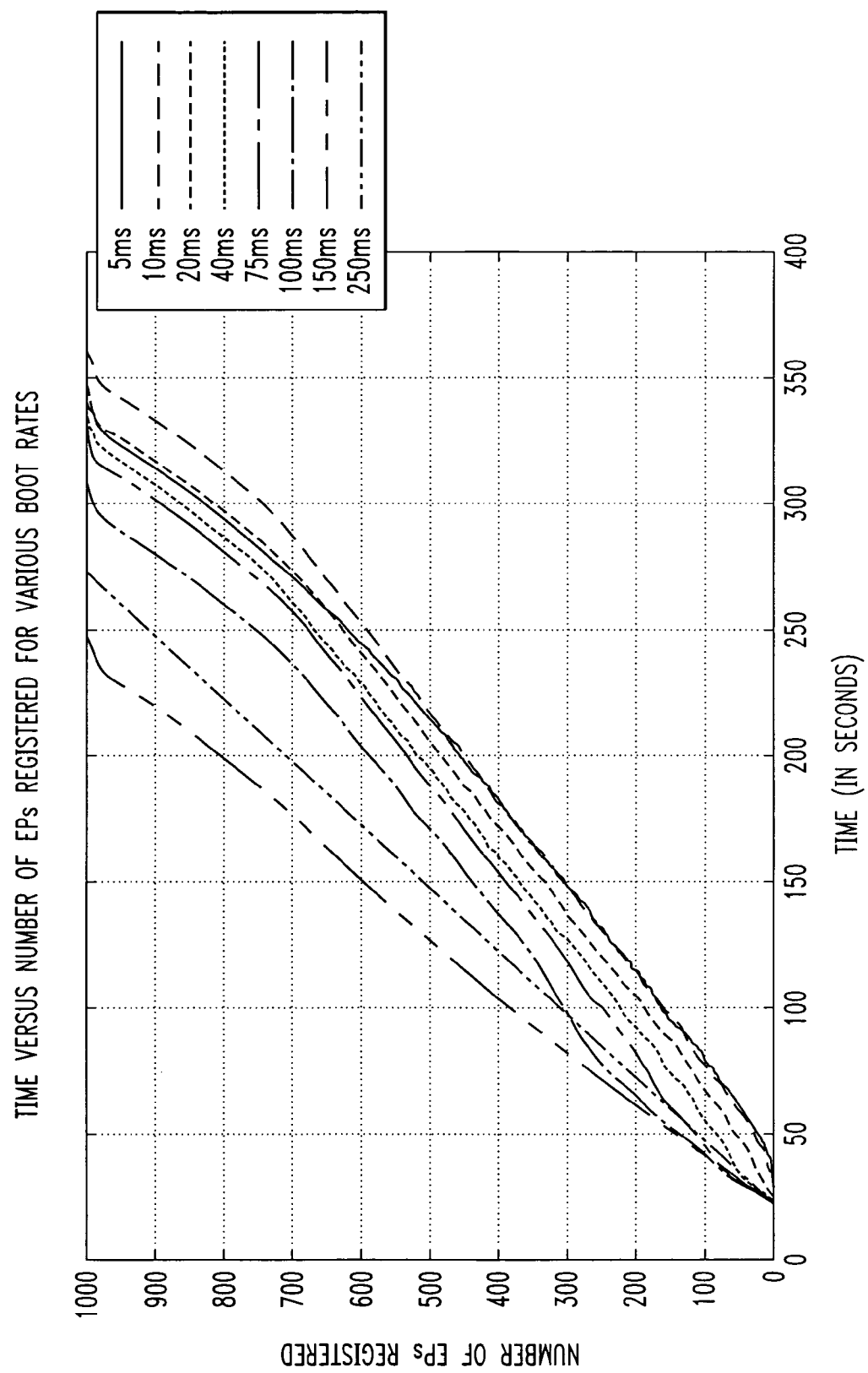
FIGS. 8 through 12 are plots showing various performance aspects of illustrative embodiments of the invention.
Figure 9:
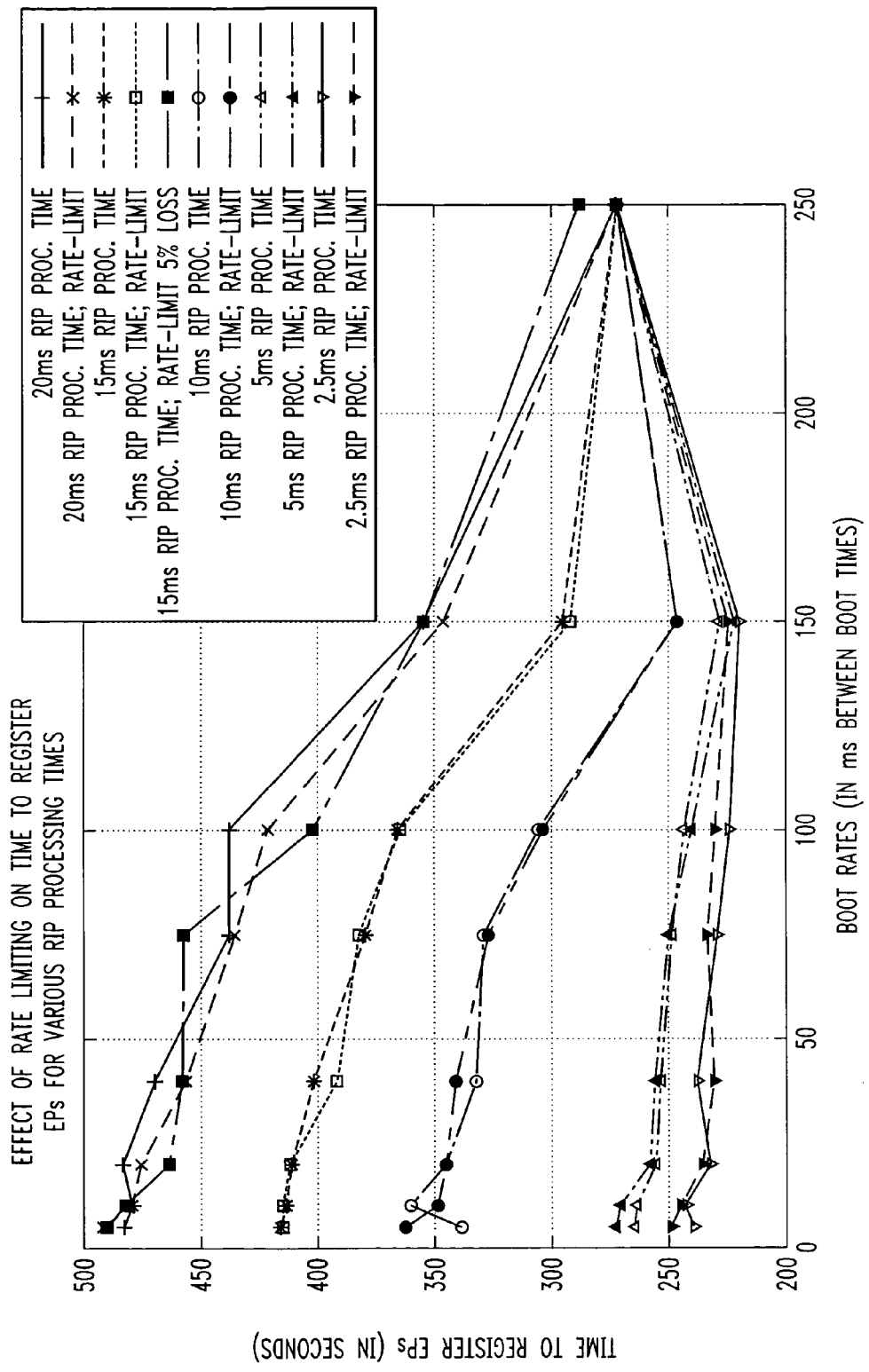

The simulation results may be graphed in any of a few ways. FIG. 8, for example, graphs the number of endpoints registered (on the vertical axis) versus the time (on the horizontal axis). Each curve represents a different boot rate. FIG. 9, for example, graph the simulated results to show the amount of time required to register the endpoints (on the vertical axis) as a function of the boot rate in milliseconds (on the horizontal axis). Data points for different boot rates in the same run are connected.

FIG. 8 shows the cumulative number of endpoints registered as a function of time for various boot rates. Note that the first registration does not occur until after 30 seconds because the simulator includes the booting process on the IP endpoints (though, for these experiments, the endpoints were configured to bypass the DHCP and TFTP servers). The RIP message processing time was set to 10 ms for this graph. In general, the time required to register the endpoints decreases as the boot rate decreases until it passes an optimal value (near 150 ms). Beyond the optimal value, the server was idle while waiting for the endpoints to attempt to register.

For the slowest boot rate, the curve is flat, because the server was always free to process the next request. The second slowest boot rate (150 ms) was slightly faster than the optimal rate. A few requests needed to be retried, resulting in an infection point for the last 40 or so endpoints. The curves for the fastest boot rates have an inflection point for the around 40 seconds before the first few endpoints registered. This suggests that the server was completely overwhelmed until after the RIP message processing has spaced out the requests. For example, it is likely that the GRQ messages were being dropped due to the limited length input queue on the server.

For the quickest boot rate (5 ms), the endpoints took 338 seconds to register, which is slightly better than the 360 seconds required for next quickest boot rate (10 ms). This effect had been observed in other experiments. With the extremely short boot rate, it is likely that many requests, which would otherwise force the server to process a RIP message reply, got dropped at the server's input queue.

In the worst-case (10 ms boot rate), the endpoints required 360 seconds to register. The best-case (150 ms) required only 247 seconds. Setting the local random back-off rate to 150 seconds, the registration time could be reduced by 113 seconds from the worst case. Measuring from the time the first endpoint completes the boot process (i.e., ignoring the 25 second boot time before the first registration message was sent), the back-off approach improved the registration time by more than ⅓.

FIG. 9 shows the effect of rate limiting at the WAN router. Rate limiting was only effective in certain situation: For example, with a boot rate of 40 ms and a RIP message processing time of 15 ms, rate-limiting improves the performance by 2.5% (from 401 to 391 seconds). In most other scenarios, rate-limiting had no noticeable effect on performance or led to a slight degradation.

Figure 10:
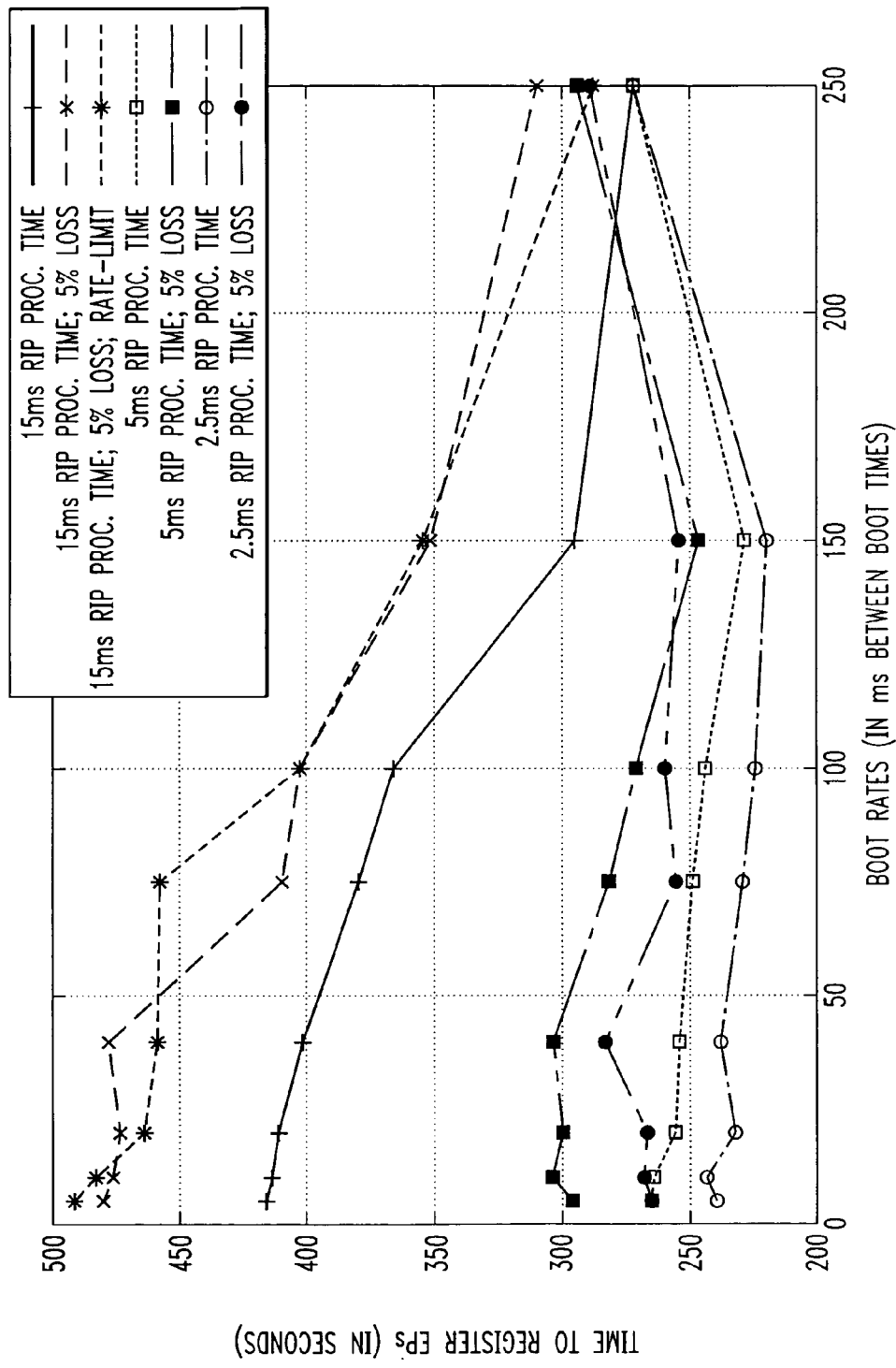

FIG. 10 shows the effect of 5% random packet loss. As expected, a high level of packet loss increased the time needed to complete the registration process because useful packets were dropped. What may be surprising, is how resilient the system was to packet loss. Note that the combination of packet loss and rate-limiting often performed worse than packet loss alone. In each case, the local back-off was still effective in reducing the completion time compared to the best-effort case.

Most of the runs in FIG. 8 show a tail effect where the last few endpoints take longer to register than the average case. This is a side effect of the back-off techniques and endpoint procedures, which may require the endpoint to back-off or reboot while it is unable to register.

Figure 11:
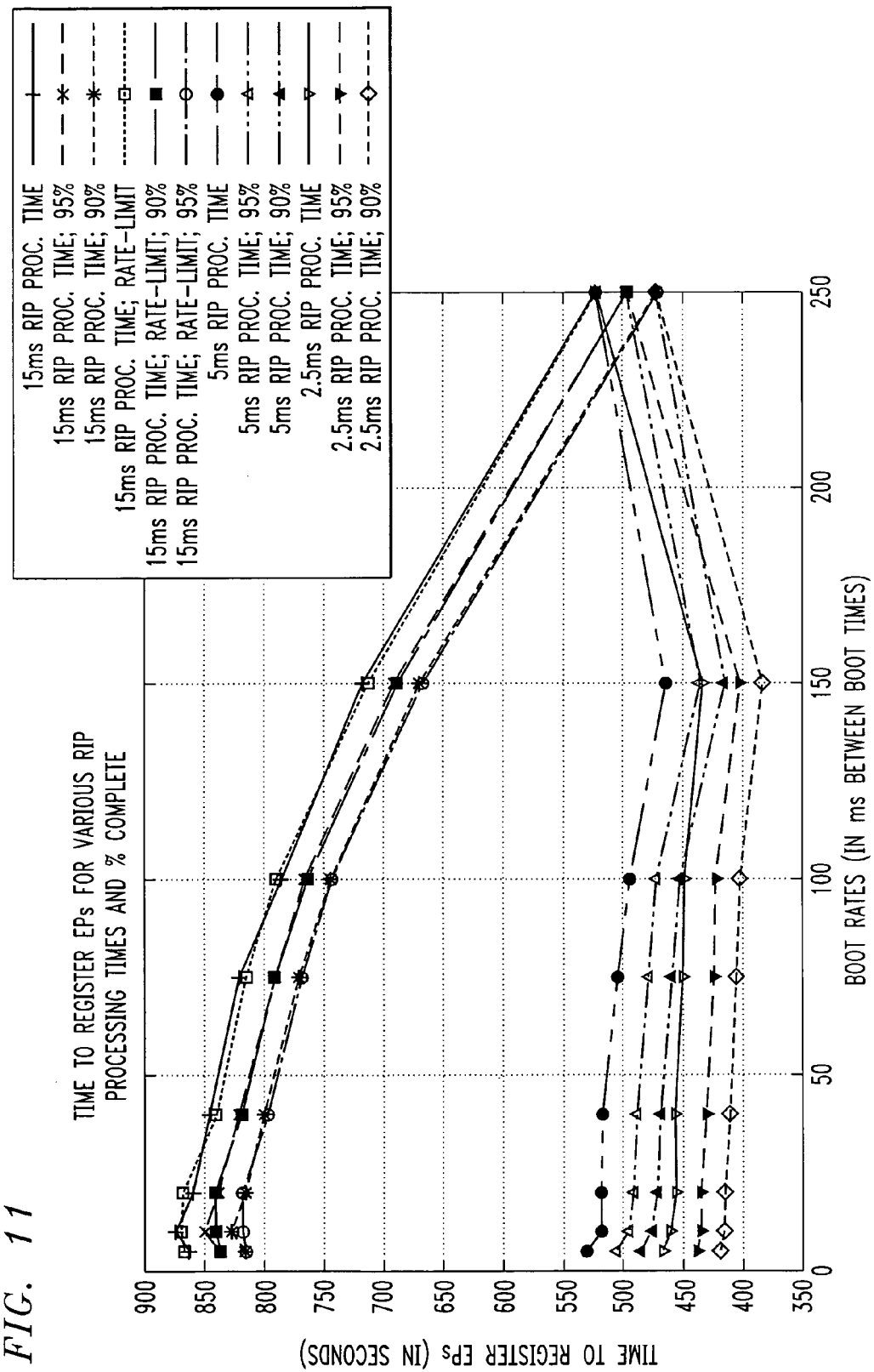

The best solution for the illustrative embodiment is probably one that registers the majority of the endpoints most quickly. This is slightly different from the time to register all the endpoints, which is what the results measure. To see if the time to register the last few phones is significant, FIG. 11 shows the time to register 100%, 95%, and 90% of 2000 endpoints with three RIP message processing times.

The difference between the shape for curves is slight. Some skewing can be seen between the 2.5 and 5 ms boot rates. This suggests that the tail effect has a slight role with extremely quick boot times, but is small enough that it is reasonable to use the 100% completion time in the analysis.

Another set of runs was simulated to show the effect of doubling the number of endpoints attempting to register to 2000. These results are shown in FIG. 11. With a 15 ms RIP message processing time, the effect of the local back-off was substantial. An average back-off of 250 ms was about 40% more efficient than for 10 ms. The optimal boot rate was between 150 ms and 250 ms. A back-off of 175 ms (not shown in the figure), completes in 462 seconds, almost half the time. For smaller RIP message processing times, the local back-off may improve the registration time, but not as significantly as with the larger RIP message processing time.

Figure 12:
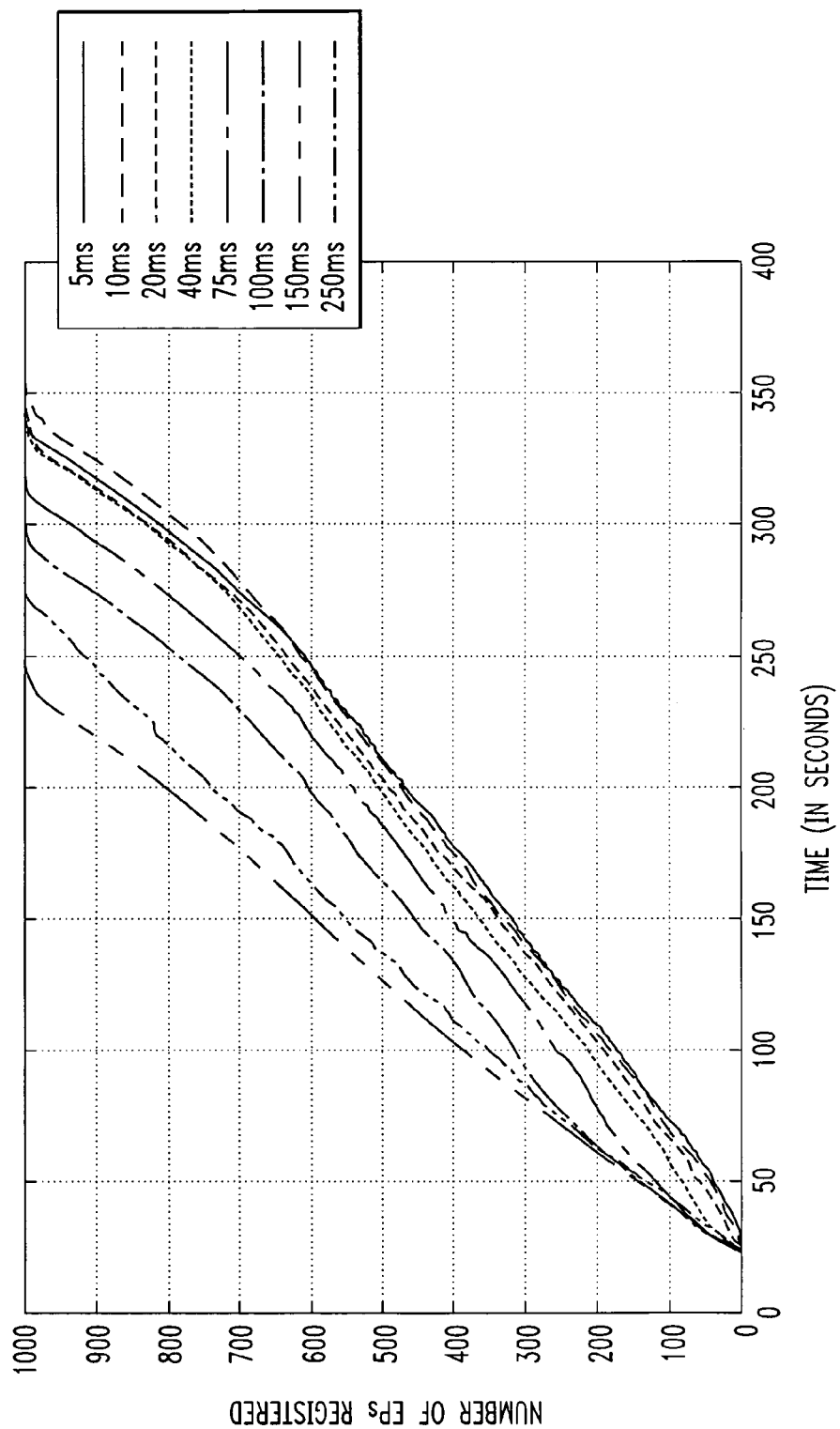

The data in the results described above assumed that the spacing between the initial registration requests was distributed evenly. That is, for a boot rate of 5 ms the endpoints sent registration messages at times 0, 5 ms, 10 ms, ..., 995 ms. This may not be realistic for a practical system, because the endpoints start more or less independently. To capture the random nature of the local random back-off technique, the experiment in FIG. 8 was repeated with the phones independently choosing random back-off times. The new results are shown in FIG. 12. The two graphs are nearly identical except for the waviness in the latter and a slight improvement for the cases with high boot rates. This suggests that it was reasonable to simulate a fixed spacing between registration times, instead of a random spacing. Using a fixed spacing had the advantage that the results were repeatable (except where random packet loss was used).

It should be emphasized that the particular arrangements used in the above simulations are merely examples, and should not be viewed as requirements of the invention.

In alternative embodiments of the invention, the described techniques may be applied to systems other than those comprising distributed call center sites. For example, the techniques of the invention may be applied to a single-site system.

The above-described embodiments of the invention are intended to be illustrative only. For example, it should be noted that the exemplary system configuration shown in FIG. 1 may be altered to incorporate a wide variety of different arrangements of components to provide the processing functions described herein. One such alternative arrangement may be configured such that the described techniques are implemented at least in part in a so-called "off-board" server, e.g., a server outside of a system switch. In this type of arrangement, one or more servers control the distribution of work to agents in an enterprise, such that the processing functions related to distribution can be moved in whole or in part from the switch to the servers. The term "call center" as used herein is intended to include these and other alternative systems in which the present invention can be implemented.

The local random back-off approach described above may be implemented using other types of local back-off, for example, back-off which is not necessarily random, but is instead pseudorandom or follows a particular predetermined pattern.

Also, the AS described above is merely an example of one type of proxy that may be used to provide the associated functionality, and other types of proxies, based on techniques other than the described token bucket technique, may be used.

It should also be noted that the invention may be implemented at least in part in the form of a computer-readable medium or other similar medium containing software which, when executed by a computer or other type of processor, will cause the processor to implement the processing functions described above. For example, such software programs may be stored in memory 115 or any other computer readable medium associated with the system 10, and executed by processor 116 or other processing hardware associated with the system 10. These and numerous other alternative embodiments within the scope of the following claims will be apparent to those skilled in the art.

What is claimed is:

1. A method comprising:
    receiving at an endpoint an indication of duration $M_{opt}$, wherein:
        i. the indication of duration $M_{opt}$ is received during a first registration of the endpoint with a call processing system, and
        ii. as a result of the first registration, a connection is established between the endpoint and the call processing system; and responsive to a detection of a failure of the connection between the endpoint and the call processing system, transmitting a message from the endpoint, wherein:
    i. the message is transmitted as part of a second registration of the endpoint with the call processing system,
    ii. the message is transmitted after a delay period has passed since the detection of the failure,
    iii. the delay period has duration D,
    iv. D is randomly selected by the endpoint, and
    v. D is less than or equal to $M_{opt}$.

2. The method of claim 1 wherein the endpoint is an Internet Protocol (IP) endpoint.

3. The method of claim 1 wherein the message is a User Datagram Protocol (UDP) message.

4. The method of claim 1 wherein the second registration of the endpoint with the call processing system comprises: sending a GRQ message, receiving a GCF message, sending a RRQ message, and receiving a RCF message.

5. The method of claim 1 wherein:
the message is transmitted from the endpoint to a server; and
the call processing system further comprises a router coupled between the endpoint and the server, the router being operative to limit a rate at which messages are delivered from the endpoint to the server.

6. The method of claim 5 wherein the messages comprise GRQ messages.

7. The method of claim 1 wherein:
the message is transmitted from the endpoint to a server; and
the server, if it is unable to process a specified message of the sequence for the given endpoint because it is already handling a registration process for a maximum number of the endpoints, is operative to send to the given endpoint a message indicating that another registration is in progress and requesting that the endpoint retry its registration attempt after a designated interval.

8. The method of claim 1 wherein:
the indication of $M_{opt}$ is transmitted by a server; and
the server is part of the call processing system.

9. The method of claim 1 wherein the indication of duration $M_{opt}$ depends on a count of endpoints that are registered with the call processing system.

10. The method of claim 1 wherein the indication of duration $M_{opt}$ depends on central processing unit (CPU) capacity of the call processing system.

11. A system comprising:
a server that is part of a call processing system; and
an endpoint for:
(A) receiving an indication of duration $M_{opt}$, wherein:
    i. the indication of duration $M_{opt}$ is received from the server during a first registration of the endpoint with the call processing system, and
    ii. as a result of the first registration, a connection is established between the endpoint and the call processing system; and
(B) responsive to a detection of a failure of the connection between the endpoint and the call processing system, transmitting a message from the endpoint, wherein:
    i. the message is transmitted as part of a second registration of the endpoint with the call processing system,
    ii. the message is transmitted after a delay period has passed since the detection of the failure,
    iii. the delay period has duration D,
    iv. D is randomly selected by the endpoint, and
    v. D is less than or equal to $M_{opt}$.

12. The system of claim 11 wherein the endpoint is an Internet Protocol (IP) endpoint.

13. The system of claim 11 wherein the message is a User Datagram Protocol (UDP) message.

14. The system of claim 11 wherein the second registration of the endpoint with the call processing system comprises: sending a GRQ message, receiving a GCF message, sending a RRQ message, and receiving a RCF message.

15. The system of claim 11 comprising a router, wherein the router limits a rate at which messages are delivered from the endpoint to the server.

16. The system of claim 11 wherein the messages comprise GRQ messages.

17. The system of claim 11 wherein the server, if it is unable to process a specified message of the sequence for the given endpoint because it is already handling a registration process for a maximum number of the endpoints, sends to the given endpoint a message indicating that another registration is in progress and requesting that the endpoint retry its registration attempt after a designated interval.

18. The system of claim 11 wherein the indication of duration $M_{opt}$ depends on a count of endpoints that are registered with the call processing system.

19. The system of claim 11 wherein the indication of duration $M_{opt}$ depends on central processing unit (CPU) capacity of the call processing system.

\* \* \* \* \*